United States Patent
Cai et al.

(10) Patent No.: US 6,246,757 B1
(45) Date of Patent: Jun. 12, 2001

(54) TELEPHONE CALLING CARD SYSTEM WITH ABBREVIATED CODE DESTINATION NUMBER CAPABILITY

(75) Inventors: Yigang Cai; Shichang Yu, both of Naperville, IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/249,283

(22) Filed: Feb. 11, 1999

(51) Int. Cl.[7] .................................................. H04M 17/00
(52) U.S. Cl. ........................ 379/144; 379/114; 379/216
(58) Field of Search .................. 379/111–115, 120–121, 379/123, 127–128, 133–134, 144–145, 201, 216, 219–220

(56) References Cited

U.S. PATENT DOCUMENTS

| | | | |
|---|---|---|---|
| 5,566,229 | * 10/1996 | Hou et al. ...................... | 379/88.02 |
| 5,754,636 | * 5/1998 | Bayless et al. ................. | 379/142 |
| 5,768,358 | * 6/1998 | Venier et al. .................. | 379/207 |
| 5,974,133 | * 10/1999 | Fleischer, III et al. .......... | 379/230 |
| 5,983,093 | * 11/1999 | Haimi-Cohen .................... | 455/411 |

FOREIGN PATENT DOCUMENTS

| | | |
|---|---|---|
| 344220 | * 12/1993 | (JP) . |
| 244959 | * 9/1994 | (JP) . |

* cited by examiner

Primary Examiner—Duc Nguyen
(74) Attorney, Agent, or Firm—Gregory P. Gadson

(57) ABSTRACT

An abbreviated dialing code capability is introduced to a telephone calling card (prepaid or postpaid) system. A calling card account customer can, via an intelligent network (IN) dial a recognized abbreviated dialing code in place of a full-length destination telephone number. A table of abbreviated codes and corresponding telephone numbers is stored for each calling card account. The calling card account subscriber or calling card customer (if given access by the calling subscriber when they are not the same person or entity) can modify the table by changing the destination number associated with a particular code, or changing the abbreviated code by changing the actual digits in the code, the number of digits, designating start, stop or cancel digits, or combinations of the above. The IN includes a service switching point (SSP) and a service control point (SCP). The SCP obtains information from the card customer's input data, account information from the database, and abbreviated dialing code information from the stored table. Modification is via a service management system (SMS)/global service management system (GSMS). Connection to the SMS/GSMS can be made by a variety of links including direct telephone link, and the Internet.

12 Claims, 2 Drawing Sheets

Figure 1:
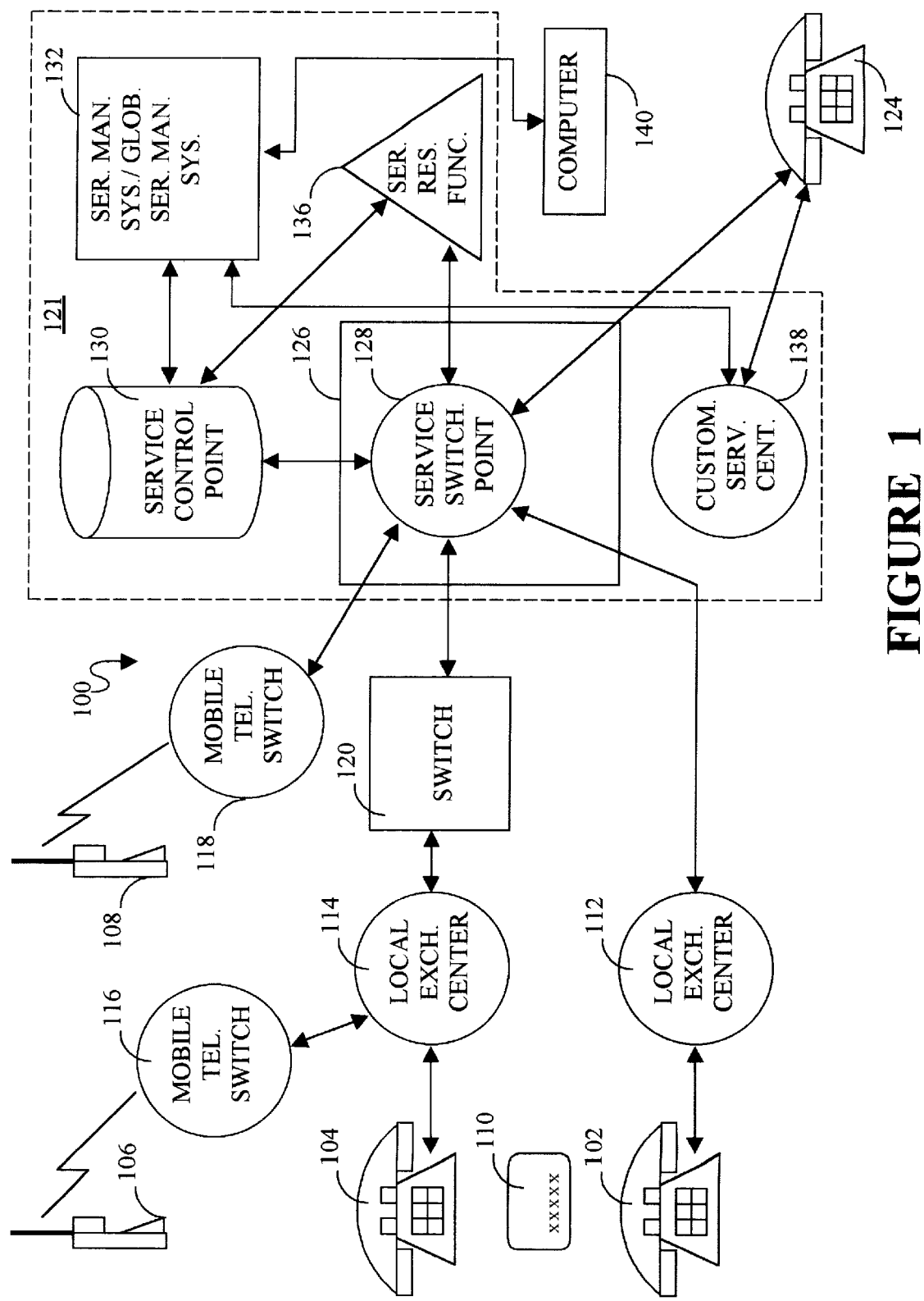

TELEPHONE CALLING CARD SYSTEM WITH ABBREVIATED CODE DESTINATION NUMBER CAPABILITY

BACKGROUND OF THE INVENTION

1. Field of the Invention

The present invention generally relates to networks for providing telephone services. More particularly, the present invention relates to improvements in telephone services accessible with pre-paid and post-paid calling cards.

2. Background of Related Art

Telephone calling cards store information used in connection with the delivery of, and billing for telephone services. "Pre-paid" calling cards are associated with an account having a fixed of amount of charges allowable. "Post-paid" calling cards are associated with accounts where the charges are paid in arrears for each billing cycle.

Calling cards vary in complexity from so-called "smart cards" to simple magnetic stripe cards. Smart cards contain memory locations for storing and updating information regarding the account or card user, and a microprocessor for performing various operations. Smart cards are connected to an intelligent terminal which interfaces with a telephone network. The actual coupling between the smart card and the intelligent terminal can be physical, inductive or capacitive. The control of a telephone transaction using such a card may be distributed between the network and the card.

Notwithstanding the above, many calling cards lack a microprocessor, limiting the operation of the card to transferring and storing information upon direction from the network. In perhaps the most common form, a calling card is simpler yet, containing only a read-only magnetic stripe storing a unique card number, and the like. In the case of the latter type of calling card, the network performs most of the operations necessary to complete a transaction.

In a typical calling card transaction, a user desiring to place a call takes a telephone off-hook and dials an access number, perhaps followed by the number printed on the calling card (corresponding to an account), a personal identification number (PIN) for security purposes, and then the destination telephone number. Alternatively, information such as the calling card number can be read by a card reader or magnetic stripe reader if such a device is attached to the user's telephone terminal.

A central database associated with the intelligent network stores all of the calling card numbers supported by the system, along with a corresponding PIN for each. The PIN input by the user is compared to the correct PIN stored in memory. If the input PIN matches the stored PIN, the intelligent network instructs a switch in the system to complete the connection and establish the desired call. If the PIN transmitted by the user does not match the stored PIN, the call is refused, whereupon the user is either given further opportunities to enter the correct PIN, or the call is terminated, or other action is taken, depending on the "call flow." The call flow of a telephone system is a comprehensive algorithm controlling logic used to establish and maintain a call.

Abbreviated dialing codes are a series of one or more alphanumeric digits representing a longer string of digits constituting a destination telephone number. For example, a "*" followed by an "8" might represent the telephone number "1-800-555-1212." Abbreviated dialing codes permit a customer to connect to a destination telephone number without having to correctly remember a large number of digits. Further, the fewer digits of an abbreviated dialing code allows for faster connection, and reduces the probability that the "wrong" destination number will be dialed.

Many common telephones and some IN calls (such VPN calls) allow abbreviated dialing, giving the user the aforementioned advantages when they are utilized. However, abbreviated dialing codes have not heretofore been available in telephone calling card systems so that a customer can use this feature regardless of the telephone used or the origination telephone line to which the input telephone is connected. This deficiency is more noticeable when the customer dials important numbers that are not (or not quite) memorized, such as to a relative or local corporate office (when the customer is traveling), and has no handy personal telephone book.

Accordingly, what is sorely lacking in the prior art is a telephone calling card service system allowing the calling card customer to conveniently use abbreviated dialing codes in place of cumbersome long destination numbers. Consistent with the above is a calling card service system allowing the calling card account subscriber to establish and modify programmable abbreviated dialing codes corresponding to desired destination telephone numbers, and to allow the calling card customer the same programming ability when the calling card account subscriber so authorizes.

SUMMARY OF THE INVENTION

In view of the above-identified problems and limitations of the prior art, the present invention provides a telephone calling card service system for making telephone calls to be charged to an account represented by a telephone calling card number. The system at least includes an input telephonic device (such as an intelligent peripheral) operatively coupled to an origination telephone line, the input telephonic device having an alphanumeric information generator adapted to at least transmit a card number, security information and a destination telephone number or an abbreviated dialing code representing a stored destination telephone number. The system also includes an intelligent network operatively coupled to the origination telephone line, the intelligent network at least having a service switching point (SSP) which could be a stand alone unit or be an integrated unit that resides in a switch, a service control point (SCP) coupled to the SSP, and a destination switch coupled to the SSP (when it is a stand alone SSP) or a switch with an integrated SSP, adapted to route a valid telephone call to its destination. The SCP stores account numbers, security information, and an abbreviated dialing code table at least having programmable abbreviated dialing codes, each corresponding to a programmable destination telephone, and the SCP is adapted to convert abbreviated dialing codes received from the origination telephone line to a corresponding destination number in the table when the abbreviated dialing code is valid.

The present invention also provides a method for making telephone calls to be charged to an account represented by a telephone calling card number. The method at least includes the following steps. Providing an input telephonic device operatively coupled to an origination telephone line that transmits alphanumeric information at least including a card number, security information and a destination telephone number or an abbreviated dialing code representing a stored destination telephone number to an intelligent network. The intelligent network (operatively coupled to the origination telephone line) at least includes a service switching point (SSP) which could be a stand alone unit or be an integrated unit that resides in a switch, a service control point (SCP) coupled to the SSP, and a destination switch coupled to the SSP (when it is a stand alone SSP) or a switch with an integrated SSP, adapted to route a valid telephone call to its destination. The method further includes the SCP storing account numbers, security information, and an abbreviated dialing code table at least having programmable abbreviated dialing codes, each corresponding to a programmable destination telephone number, and the SCP converting abbreviated dialing codes received from the origination telephone line to a corresponding destination number in the table when the abbreviated dialing code is valid.

BRIEF DESCRIPTION OF THE DRAWING FIGURES

Figure 2:
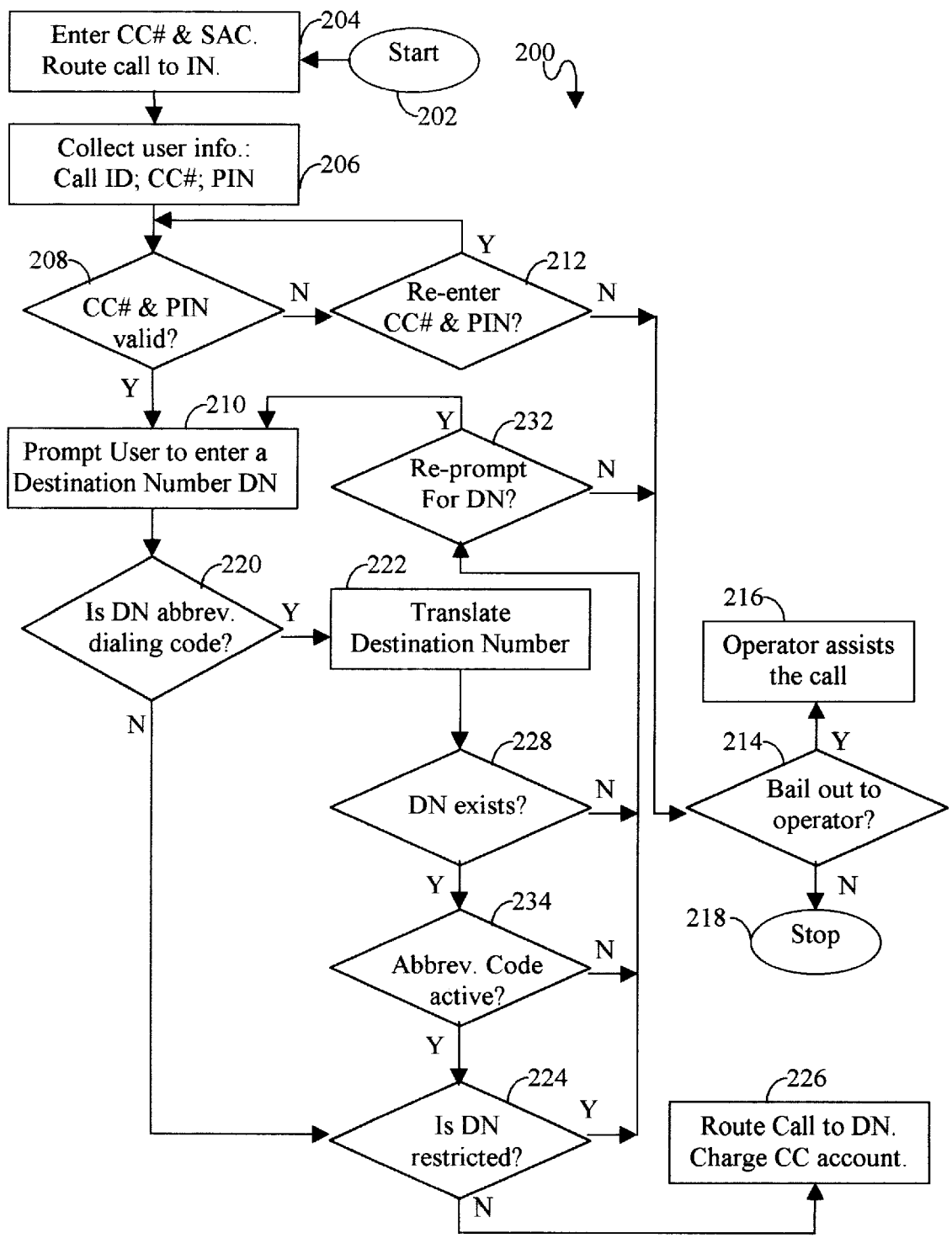

Features and advantages of the present invention will become apparent to those skilled in the art from the description below, with reference to the following drawing figures, in which:

FIG. 1 is a schematic block diagram of the present-inventive telephone calling card service system; and FIG. 2 is a flow chart detailing the call flow of the present-inventive telephone calling card service system.

DESCRIPTION OF THE PREFERRED EMBODIMENTS

The telephone calling card service system 100 of the present invention is illustrated in FIG. 1.

The system 100 includes a variety of telephonic input devices as would be common in a general telephone system. For example, a user can connect to the system 100 using such devices as common telephones 102 and 104, and mobile telephones 106 and 108. The telephones include alpha-numeric keypads for inputting Dual-Tone-Multi-Frequency (DTMF) signals, or the like, as is common.

A telephone calling card 110 (or a card number plus PIN) at least stores a card number corresponding to a calling card account, and is used to facilitate a call placement through the system 100.

Local exchange centers (LECs) 112 and 114 handle all initial calls, and route calls to a switch 120 when a service access code (SAC) is received either from the user or from a card reader (not shown) integrated into the telephone terminals. The access number indicates to the LEC that the user desires to make a calling card transaction.

The switch 120 finds an efficient route to a stand-alone service switching point (SSP) 128 or a switch 126 integrated with an SSP. The SSP is part of an automated, intelligent network (IN) 121 that processes telephone calling card account transactions (and controls call routing) according to a stored call flow.

As shown in the figure, the mobile telephones 106 and 108 connect to the intelligent network 121 via mobile telephone switches 116 and 118. In some cases (as with mobile telephone switch 118) the connection is directly to the IN when the mobile telephone switch receives the access number indicating that a calling card transaction is desired. In other cases, connection from a mobile telephone switch is first to an LEC.

Further details about the LECs (112 and 114) and switches (116, 118 and 120) will not be included in this letters patent, given their function and commonplace, as they are easily implemented by those skilled in the art.

The SSP 128 is linked to a service control point (SCP) 130. The SCP 130 has an extensive database storing every calling card number supported by the system and its associated account number, current account status information, and an abbreviated dialing code table to be explained infra. The SCP 130 performs service logic and provides the SSP 128 with call handling instructions, as provisioned by the calling card subscriber. The SSP 128 also updates the information stored in the SCP 130 (such as new charges to the account) as is appropriate. It will be appreciated by those skilled in the art that the SCP 130 can be implemented as a networked database, not limited to one geographic location.

Once a calling card user is connected to the SSP 128, the SSP 128, queries the SCP 130 for account security and restriction information pertaining to the calling card upon which the transaction is based. The SSP 128 also contains a master clock (not shown) for keeping track of current times and dates. In some embodiments, the master clock calibrates other clocks used to measure such quantities as the elapsed time of calls.

Once the SCP 130 receives a query from the SSP 128, the SCP instructs the SSP to connect to a Service Resource Functionality (SRF) or an intelligent peripheral (IP) 136. The SRF 136 can be a stand-alone unit or integrated in the switch 126. The SRF prompts the user for, and collects information such as the calling card number, PIN, and the destination number (DN) or abbreviated dialing code, to send to the SCP. If the PIN matches the stored PIN, the transaction continues. If not, the user can be given extra tries to enter the correct PIN. Failing entry of the correct PIN, the IN transfers the call to an operator service position system (OSPS) or customer service center 138 to connect the caller with a telephone operator. Then, the telephone operator can assist the caller by connecting to the destination telephone/ telephone number 124 if appropriate, or terminate the call.

After the PINs have been matched, the SRF 136 prompts the customer to transmit either a destination number or an abbreviated dialing code. In the preferred embodiment, a service management system (SMS) or global service management system (GSMS) 132 are employed to provision the abbreviated dialing code information from an Abbreviated Dialing Code Table to be stored in the database of the SCP 130.

Table 1 is an example of an abbreviated dialing code table compatible with the present invention.

TABLE 1

Sample Abbreviated Dialing Code Table

| Example Code | Code Active? | Example Destination Number |
|---|---|---|
| 1# | Yes | w-www-www--357 |
| 2# | Yes | w-www-www-2468 |
| 5# | No | x-xxx-xxx-1234 (Mon.–Fri.) |
| 5# | Yes | x-xxx-xxx-4321 (Sat.–Sun.) |
| 7# | Yes | y-yyy-yyy-2468 (8 a.m.–6 p.m.) |
| 7# | Yes | y-yyy-yyy-8642 (6 p.m.–8 a.m.) |
| 9# | Yes | abc-zzz-zzz-zzzz (from country code abc) |
| 9# | No | def-zzz-zzz-zzzz (from country code def) |
| 9# | Yes | ghi-zzz-zzz-zzzz (from country code ghi) |
| 9# | Yes | abc-zzz-zzz-zzzz (default from other country codes) |
| ??# | ? | ??????????????? |

In the example, "#" serves as a "stop" digit, indicating to the IN 121 that the previous digits received represent a stored destination number, and that the abbreviated code is finished. It will be appreciated by those skilled in the art to which the present invention pertains that the stop digit can be other alphanumeric characters/symbols, such as "*." Further, instead of using stop digits, the abbreviated dialing code of a system 100 can use "start" digits indicating to the IN when received, that an abbreviated dialing code is to follow. Alternatively, such a system can employ both start and stop digits.

Also, an alphanumeric key can serve as a "cancel" digit, that when pressed, indicates to the IN 121 that the previous digit was in error and should be disregarded. For example, the "#" might serve as a stop digit, while the "*" might serve as a cancel digit.

When the IN 121 receives an abbreviated dialing code, the SCP 130 first checks the table stored for the calling card account to see if the code exists. If so, the SCP 130 ascertains whether the abbreviated dialing code in question is active. If the abbreviated dialing code received is either non-existent or inactive the SRF 136 apprises the customer and prompts the customer to enter a new abbreviated code according to the call flow.

An active abbreviated code is converted to the corresponding destination number by SCP 130 and sent to the switch 126. The switch 126 and SSP 128 route the incoming telephone call to the destination number to complete the call.

In the preferred embodiment, every connected call through the system 100 is time stamped at the beginning of the call. The current date and time are used in conjunction with some abbreviated dialing codes to choose among more than one possible destination number. For example, if an abbreviated dialing code for a calling card account is intended to reach one's employed spouse, the abbreviated code might be converted to a work number on weekday's during normal business hours, and it might be converted to a home number all other dates and times.

The initial abbreviated dialing codes and creation of a calling card account are made by provisioning at the SMS/GSMS, and stored in the SCP database in advance. The calling card subscriber can change or modify the provisioning of the abbreviated dialing codes associated with his/her calling card account by (1) telephoning the IN 121 (SSP/SCP) with a specified SAC, or by (2) connecting to the SMS/GSMS via the customer service center, or by (3) connecting to the SMS/GSMS with a desktop computer, network computer, or the like (140).

Modifications include matching a given abbreviated dialing code with a new destination number, inactivating (or activating) existing abbreviated dialing codes, and even changing the format of abbreviated dialing codes, such as the number of digits to be included in codes and which if any alpha-numeric symbols will serve as start, stop or cancel digits. As was previously mentioned, modifications may include making the abbreviated code conversion contingent upon current date, time and geographic location or place where the origination call is made.

FIG. 2 details the call flow 200 of the system 100. After the start (Step 202) of the algorithm 200, a calling card user's call is routed to the IN 121 based upon the calling card number and the service access code (SAC) at Step 204. At step 206, the telephonic input device transmits such information as call line identification (as is standard), the calling card number, and the PIN (the last two pieces of information being keyed-in by the user).

At step 208, the IN 121 (through the SCP 130) performs a validity check to ensure that the PIN input by the user matches the PIN stored in the SCP 130. If the match is made, the algorithm 200 advances to step 210. If not, the algorithm 200 advances to step 212. At step 212 the user receives a predetermined number of opportunities to re-enter a calling card number and its matching PIN.

Once the calling card is validated at step 208, the algorithm prompts the customer to enter the destination number (DN) or an abbreviated dialing code (Step 210). At Step 220 the algorithm determines whether the destination number is in the form of an abbreviated dialing code. If so, the algorithm advances to Step 222. Otherwise, the algorithm advances to Step 224.

Step 224 determines whether there are geographic or scheduling restrictions associated with either the origination telephone number, the destination telephone number, or the time and date of the call, as established by the calling card account subscriber. The possibilities of such restrictions are numerous, and will not be further detailed here.

Restricted calls are not completed, but rather, the algorithm advances to Step 232 to give the customer further opportunities to input abbreviated dialing codes or destination numbers. Calls which are not restricted, however, are routed to the destination number, with an appropriate charge to the calling card account (Step 226).

At Step 232, if a fixed number of re-prompts has already occurred or a predefined time interval elapses, the algorithm goes to Step 214 to determine whether the IN should bail out to a customer service center to speak to a telephone operator (Step 216), or stop the call (Step 218).

Returning to Step 222, the SCP 130 converts the received abbreviated dialing code into a destination telephone number, as specified by the stored abbreviated dialing code table for the calling card account in question. If the destination number exists (Step 228) in the system 100, the algorithm determines whether the abbreviated code is active (Step 234) as specified by the subscriber or other operation of the system. If either test in Steps 228 and Step 234 is answered in the negative, the algorithm returns to Step 232, to allow the customer to enter a new abbreviated dialing code.

Existing destination numbers derived from active abbreviated dialing codes are tested at Step 224 for the presence of restrictions, as described supra. Finally, non-restricted calls are routed to their destination (Step 226).

Variations and modifications of the present invention are possible, given the above description. However, all variations and modifications which are obvious to those skilled in the art to which the present invention pertains are considered to be within the scope of the protection granted by this Letters Patent.

For example, both pre-paid and post-paid calling cards may be used in conjunction with the present invention.

What is claimed is:

1. A telephone calling card service system for making telephone calls to be charged to an account represented by a telephone calling card number, said system comprising:

an input telephonic device operatively coupled to an origination telephone line, said input telephonic device comprising an alphanumeric information generator adapted to at least transmit a card number, security information, and a destination telephone number or an abbreviated dialing code representing a stored destination telephone number; and an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each corresponding to a programmable destination telephone number, and said SCP adapted to convert abbreviated dialing codes received from said origination telephone line to a corresponding destination number in said table when said abbreviated dialing code is valid;

wherein said abbreviated dialing code comprises a start digit signifying the beginning of said code and at least one representation digit representing a destination telephone number; and wherein said abbreviated dialing code comprises a cancel bit for canceling one or more representation bits.

2. A telephone calling card service system for making telephone calls to be charged to an account represented by a telephone calling card number, said system comprising:

an input telephonic device operatively coupled to an origination telephone line, said input telephonic device comprising an alphanumeric information generator adapted to at least transmit a card number, security information, and a destination telephone number or an abbreviated dialing code representing a stored destination telephone number; and an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each corresponding to a programmable destination telephone number, and said SCP adapted to convert abbreviated dialing codes received from said origination telephone line to a corresponding destination number in said table when said abbreviated dialing code is valid;

wherein said abbreviated dialing code comprises at least one representation digit representing a destination telephone number and an end digit signifying the end of said code; and wherein said abbreviated dialing code comprises a cancel bit for canceling one or more representation bits.

3. A telephone calling card service system for making telephone calls to be charged to an account represented by a telephone calling card number, said system comprising:

an input telephonic device operatively coupled to an origination telephone line, said input telephonic device comprising an alphanumeric information generator adapted to at least transmit a card number, security information, and a destination telephone number or an abbreviated dialing code representing a stored destination telephone number; and an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each corresponding to a programmable destination telephone number, and said SCP adapted to convert abbreviated dialing codes received from said origination telephone line to a corresponding destination number in said table when said abbreviated dialing code is valid;

wherein said abbreviated dialing code comprises a start digit signifying the beginning of said code, at least one representation digit representing a destination telephone number, and an end digit signifying the end of said code; and wherein said abbreviated dialing code comprises a cancel bit for canceling one or more representation bits.

4. A telephone calling card service system for making telephone calls to be charged to an account represented by a telephone calling card number, said system comprising:

an input telephonic device operatively coupled to an origination telephone line, said input telephonic device comprising an alphanumeric information generator adapted to at least transmit a card number, security information, and a destination telephone number or an abbreviated dialing code representing at least one stored destination telephone number; and an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each abbreviated dialing code associated with a calling card account and with at least one destination telephone number programmable by a user authorized to use the associated calling card account, and said SCP adapted to convert abbreviated dialing codes received from said origination telephone line to a destination number in said table when said abbreviated dialing code is valid;

wherein said abbreviated dialing code table also comprises geographic contingency information for each programmed abbreviated dialing code such that a destination telephone number chosen by said SCP from said abbreviated dialing code table is chosen based upon the geographic location of a current customer.

5. A telephone calling card service system for making telephone calls to be charged to an account represented by a telephone calling card number, said system comprising:

an input telephonic device operatively coupled to an origination telephone line, said input telephonic device comprising an alphanumeric information generator adapted to at least transmit a card number, security information, and a destination telephone number or an abbreviated dialing code representing at least one stored destination telephone number; and an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each abbreviated dialing code associated with a calling card account and with at least one destination telephone number programmable by a user authorized to use the associated calling card account, and said SCP adapted to convert abbreviated dialing codes received from said origination telephone line to a destination number in said table when said abbreviated dialing code is valid;

wherein said abbreviated dialing code table also comprises date contingency information for each programmed abbreviated dialing code such that a destination telephone number chosen by said SCP from said abbreviated dialing code table is chosen based upon the date of the current telephone call.

6. A telephone calling card service system for making telephone calls to be charged to an account represented by a telephone calling card number, said system comprising:

an input telephonic device operatively coupled to an origination telephone line, said input telephonic device comprising an alphanumeric information generator adapted to at least transmit a card number, security information, and a destination telephone number or an abbreviated dialing code representing at least one stored destination telephone number; and an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each abbreviated dialing code associated with a calling card account and with at least one destination telephone number programmable by a user authorized to use the associated calling card account, and said SCP adapted to convert abbreviated dialing codes received from said origination telephone line to a destination number in said table when said abbreviated dialing code is valid;

wherein said abbreviated dialing code table also comprises time contingency information for each programmed abbreviated dialing code such that a destination telephone number chosen by said SCP from said abbreviated dialing code table is chosen based upon the time of the current telephone call.

7. In a telephone calling card service system, a method for making telephone calls to be charged to an account represented by a telephone calling card number, said method comprising the steps of:

via an input telephonic device operatively coupled to an origination telephone line, transmitting a card number, security information, and a destination telephone number or an abbreviated dialing code representing a stored destination telephone number; and providing an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each corresponding to a programmable destination telephone number, and said SCP adapted to convert abbreviated dialing codes received from said origination telephone line to a corresponding destination number in said table when said abbreviated dialing code is valid;

wherein said abbreviated dialing code comprises a start digit signifying the beginning of said code and at least one representation digit representing a destination telephone number; and wherein said abbreviated dialing code comprises a cancel bit for canceling one or more representation bits.

8. In a telephone calling card service system, a method for making telephone calls to be charged to an account represented by a telephone calling card number, said method comprising the steps of:

via an input telephonic device operatively coupled to an origination telephone line, transmitting a card number, security information, and a destination telephone number or an abbreviated dialing code representing a stored destination telephone number; and providing an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each corresponding to a programmable destination telephone number, and said SCP adapted to convert abbreviated dialing codes received from said origination telephone line to a corresponding destination number in said table when said abbreviated dialing code is valid;

wherein said abbreviated dialing code comprises at least one representation digit representing a destination telephone number and an end digit signifying the end of said code; and wherein said abbreviated dialing code comprises a cancel bit for canceling one or more representation bits.

9. In a telephone calling card service system, a method for making telephone calls to be charged to an account represented by a telephone calling card number, said method comprising the steps of:

via an input telephonic device operatively coupled to an origination telephone line, transmitting a card number, security information, and a destination telephone number or an abbreviated dialing code representing a stored destination telephone number; and providing an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each corresponding to a programmable destination telephone number, and said SCP adapted to convert abbreviated dialing codes received from said origination telephone line to a corresponding destination number in said table when said abbreviated dialing code is valid;

wherein said abbreviated dialing code comprises a start digit signifying the beginning of said code, at least one representation digit representing a destination telephone number, and an end digit signifying the end of said code; and wherein said abbreviated dialing code comprises a cancel bit for canceling one or more representation bits.

10. In a telephone calling card service system, a method for making telephone calls to be charged to an account represented by a telephone calling card number, said method comprising the steps of:

via an input telephonic device operatively coupled to an origination telephone line, transmitting a card number, security information, and a destination telephone number or an abbreviated dialing code representing at least one stored destination telephone number; and providing an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each abbreviated dialing code associated with a calling card account and with at least one destination telephone number programmable by a user authorized to use the associated calling card account, and said SCP adapted to convert abbreviated dialing codes received from said origination telephone line to a destination number in said table when said abbreviated dialing code is valid;

wherein said abbreviated dialing code table also comprises geographic contingency information for each programmed abbreviated dialing code such that a destination telephone number chosen by said SCP from said abbreviated dialing code table is chosen based upon the geographic location of a current customer.

11. In a telephone calling card service system, a method for making telephone calls to be charged to an account represented by a telephone calling card number, said method comprising the steps of:

via an input telephonic device operatively coupled to an origination telephone line, transmitting a card number, security information, and a destination telephone number or an abbreviated dialing code representing at least one stored destination telephone number; and providing an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each abbreviated dialing code associated with a calling card account and with at least one destination telephone number programmable by a user authorized to use the associated calling card account, and said SCP adapted to convert abbreviated dialing codes received from said origination telephone line to a destination number in said table when said abbreviated dialing code is valid;

wherein said abbreviated dialing code table also comprises date contingency information for each programmed abbreviated dialing code such that a destination telephone number chosen by said SCP from said abbreviated dialing code table is chosen based upon the date of the current telephone call.

12. In a telephone calling card service system, a method for making telephone calls to be charged to an account represented by a telephone calling card number, said method comprising the steps of:

via an input telephonic device operatively coupled to an origination telephone line, transmitting a card number, security information, and a destination telephone number or an abbreviated dialing code representing at least one stored destination telephone number; and providing an intelligent network (IN) operatively coupled to said origination telephone line, said IN comprising a service switching point (SSP), a service control point (SCP) coupled to said SSP, and a destination switch coupled to said SSP adapted to route a valid telephone call to its destination telephone number;

said SCP storing account numbers, security information, and an abbreviated dialing code table comprising programmable abbreviated dialing codes, each abbreviated dialing code associated with a calling card account and with at least one destination telephone number programmable by a user authorized to use the associated calling card account, and said SCP adapted to convert abbreviated dialing codes received from said origination telephone line to a destination number in said table when said abbreviated dialing code is valid;

wherein said abbreviated dialing code table also comprises time contingency information for each programmed abbreviated dialing code such that a destination telephone number chosen by said SCP from said abbreviated dialing code table is chosen based upon the time of the current telephone call.

* * * * *